No. 828,595. PATENTED AUG. 14, 1906.
J. E. BONSER.
TRAP.
APPLICATION FILED AUG. 10, 1905.
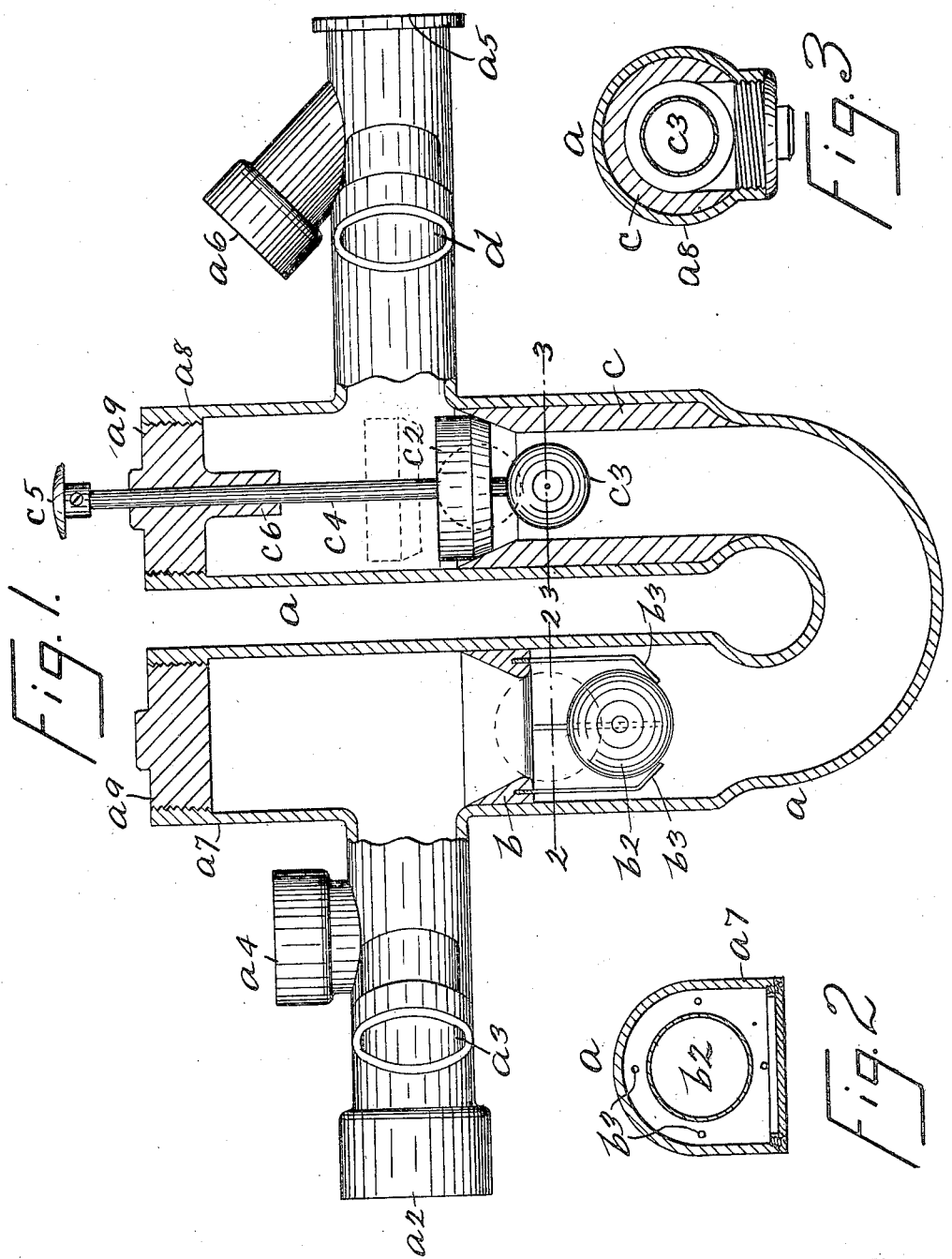
WITNESSES
J. C. Larsen
F. A. Stewart
INVENTOR
James E. Bonser
BY
Edgar Tate & Co
ATTORNEYS

UNITED STATES PATENT OFFICE.

JAMES E. BONSER, OF NEW YORK, N. Y.

TRAP.

No. 828,595.     Specification of Letters Patent.     Patented Aug. 14, 1906.

Application filed August 10, 1905. Serial No. 273,523.

*To all whom it may concern:*

Be it known that I, JAMES E. BONSER, a citizen of the United States, residing at New York, in the county of New York and State of New York, have invented certain new and useful Improvements in Traps, of which the following is a specification, such as will enable those skilled in the art to which it appertains to make and use the same.

The object of this invention is to provide a double-seal sewer-gas and backwater trap which is adapted to be used in combination with area-drain outlet, house-outlet, fresh-air inlet, street-sewer clean-out, and boiler blow-off, a further object being to provide a double-seal device which way be used on all fixture-traps—such as U-traps, S-traps, half-S traps, three-quarter-S traps, &c.—and a still further object being to provide a trap of this class which permits of ready access to the seals and also to provide a trap of this kind which is simple in construction and operation and comparatively inexpensive and well adapted for the purpose intended.

The invention is fully disclosed in the following specification, of which the accompanying drawings form a part, in which the separate parts of my improvement are designated by suitable reference characters in each of the views, and in which—

Figure 1 is a longitudinal sectional view of a trap constructed according to my invention; Fig. 2, a section on the line 2 2 of Fig. 1, and Fig. 3 a section on the line 3 3 of Fig. 1.

In the drawings forming part of this specification I have shown a U-shaped trap $a$, the inlet side or leg of which is provided with a tubular inlet $a^2$, with which in practice the house-pipe is connected, and said tubular inlet is provided with a branch $a^3$, forming an area-drain, and with an air-inlet $a^4$, and the outlet leg or side of said trap is provided with a tubular sewer-outlet $a^5$, having a boiler-blow-off connection $a^6$, and said trap, as shown in the drawings, is composed of two members $a^7$ and $a^8$, each of which is provided with a screw-plug $a^9$ in the top thereof.

The member $a^7$ is provided beneath the inlet $a^2$ with an annular shoulder-flange $b$, which is adapted to serve as a valve-seat for a valve $b^2$, and the float $b^2$ is held in position by means of a cage composed of a plurality of wires $b^3$, which are screwed into the annular flange $b$ and are bent inwardly at the bottom, as clearly shown in the drawings, and it will be seen that when the valve $b^2$ is in its lowermost position the drainage is free to pass through the trap, and in case of backwater the valve $b^2$ assumes the position indicated in dotted lines and prevents water from backing up into the house or area. The member $a^8$ of the trap is also provided with a sleeve $c$, which is inclined at its top, as shown, to serve as a seat for a vertically-movable valve $c^2$, with which is connected a float $c^3$ at the bottom thereof and which is also provided with a rod $c^4$ at the top thereof, extending through the plug $a^9$ and being provided with a handle $c^5$ at its top, whereby the same may be manipulated, and in practice I provide a tubular extension $c^6$, which serves as a guide for the valve-rod $c^4$.

When drainage passes from the opening $a^2$ through the trap to the sewer, the float $b^2$ assumes the position shown in full lines in Fig. 1 and the float $c^3$ assumes the position indicated in dotted lines, thereby raising the valve $c^2$, and the drainage is permitted to pass from the trap; but in the event of tide-water or backwater entering the trap the valve $c^2$ assumes the position shown in full lines in Fig. 1 and the float $b^2$ assumes the position indicated in dotted lines and the water cannot pass backwardly through said trap. It sometimes happens that small pieces of wood or various kinds of refuse are forced backwardly through the trap and may become lodged beneath the valve $c^2$, and when this happens the said valve may be raised and forcibly pushed downward by means of the handle $c^5$ in order to dislodge or break the said stick or other matter which may have become lodged under the valve $c^2$, and in this way the passage therethrough is clear and the valve may find its seat.

I have also shown, in connection with the member $a^8$ of the trap, a side flush or clean-out inlet $d$, and in practice I prefer to utilize all the inlets and outlets to the trap, as shown; but it will be obvious that some of them may be dispensed with in order to adapt the trap to various uses to which it may be put, and various other changes in and modifications of the construction herein shown and described may be made without departing from the spirit of my invention or sacrificing its advantages.

Having fully described my invention, what I claim as new, and desire to secure by Letters Patent, is—

1. A trap composed of two members each of which is open at its top and provided with a screw-plug, an inlet for one of said members, a ball-valve in said last-named member, an outlet for the other of said members, a valve in said last-named member, and a float connected with said valve, and means for operating said last-named valve from without, substantially as shown and described.

2. A trap composed of two members each of which is open at its top and provided with a screw-plug, an inlet for one of said members, a ball-valve in said last-named member, an outlet for the other of said members, a valve in said last-named member, and a float connected with said valve, and means for operating said last-named valve from without, comprising a rod secured to said valve and a handle thereon outside of said trap, substantially as shown and described.

3. A U-shaped trap, the side members of which are both closed at their upper ends by removable plugs, one side of said trap being provided with an inlet and the other with an outlet, a valve-seat in the inlet side of the trap below the inlet, a cage supported beneath said valve-seat, a valve supported in said cage, a valve-seat in the outlet side of the trap below the outlet, a valve adapted to be seated on said valve-seat, and means for operating said valve from outside of the trap, substantially as shown and described.

4. A U-shaped trap, the side members of which are both closed at their upper ends by removable plugs, one side of said trap being provided with an inlet and the other with an outlet, a valve-seat in the inlet side of the trap below the inlet, a cage supported beneath said valve-seat, a valve supported in said cage, a valve-seat in the outlet side of the trap below the outlet, a valve adapted to be seated on said valve-seat, and means for operating said valve from outside of the trap, said last-named valve being also provided with a float which is suspended therefrom, substantially as shown and described.

In testimony that I claim the foregoing as my invention I have signed my name, in presence of the subscribing witnesses, this 9th day of August, 1905.

JAMES E. BONSER.

Witnesses:
F. A. STEWART.
C. E. MULREANY.